United States Patent
Kobayashi

(10) Patent No.: US 10,250,906 B2
(45) Date of Patent: Apr. 2, 2019

(54) IMAGE PROCESSING APPARATUS, IMAGE PROCESSING METHOD AND NON-TRANSITORY COMPUTER READABLE STORAGE MEDIUM

(71) Applicant: CANON KABUSHIKI KAISHA, Tokyo (JP)

(72) Inventor: Yukifumi Kobayashi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 395 days.

(21) Appl. No.: 15/085,207

(22) Filed: Mar. 30, 2016

(65) Prior Publication Data
US 2016/0295235 A1 Oct. 6, 2016

(30) Foreign Application Priority Data

Apr. 1, 2015 (JP) ................. 2015-075474

(51) Int. Cl.
| H04N 7/12 | (2006.01) |
| H04N 19/593 | (2014.01) |
| H04N 19/176 | (2014.01) |
| H04N 19/136 | (2014.01) |
| H04N 19/105 | (2014.01) |
| H04N 19/423 | (2014.01) |

(52) U.S. Cl.
CPC ......... *H04N 19/593* (2014.11); *H04N 19/105* (2014.11); *H04N 19/136* (2014.11); *H04N 19/176* (2014.11); *H04N 19/423* (2014.11)

(58) Field of Classification Search
CPC .. H04N 19/593; H04N 19/105; H04N 19/136; H04N 19/176; H04N 19/423
USPC ...................................... 375/240.03
See application file for complete search history.

(56) References Cited

U.S. PATENT DOCUMENTS

| 2003/0123548 A1* | 7/2003 | Kajita ............... H04N 1/41 375/240.13 |
| 2006/0002466 A1* | 1/2006 | Park ............... H04N 19/196 375/240.03 |
| 2014/0334541 A1* | 11/2014 | Nakanishi ........... H04N 19/105 375/240.12 |
| 2015/0245060 A1* | 8/2015 | Takami ............... H04N 19/182 382/238 |

FOREIGN PATENT DOCUMENTS

JP 2010-004514 A 1/2010

\* cited by examiner

*Primary Examiner* — Allen C Wong
(74) *Attorney, Agent, or Firm* — Cowan, Liebowitz & Latman, P.C.

(57) ABSTRACT

An image processing apparatus comprising a supply unit configured to supply image data one piece of pixel data at a time, and an encoding unit configured to encode the image data supplied by the supply unit, the encoding unit selecting, as prediction pixel data, locally decoded data of one pixel out of n pixels (n is an integer greater than or equal to 2) that were encoded immediately before a pixel to be encoded and have been locally decoded, and encoding a difference between the prediction pixel data and data of the pixel to be encoded, wherein the supply unit supplies pixel data to the encoding unit in a predetermined order according to which all of the n pixels are pixels that are adjacent to the pixel to be encoded.

15 Claims, 10 Drawing Sheets

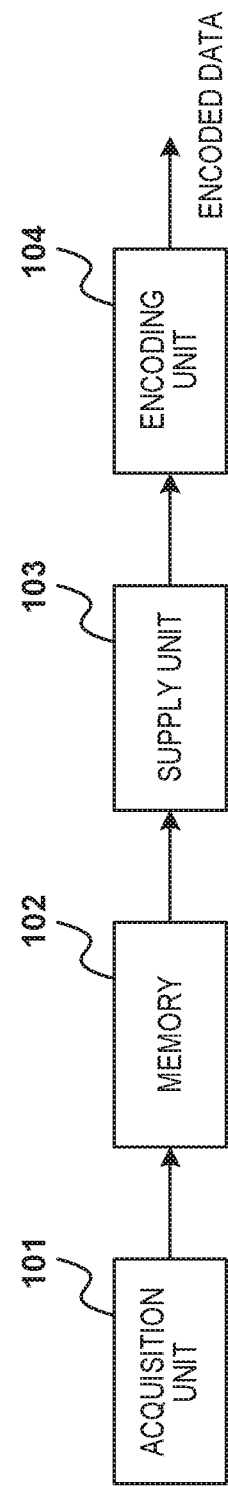

FIG. 10
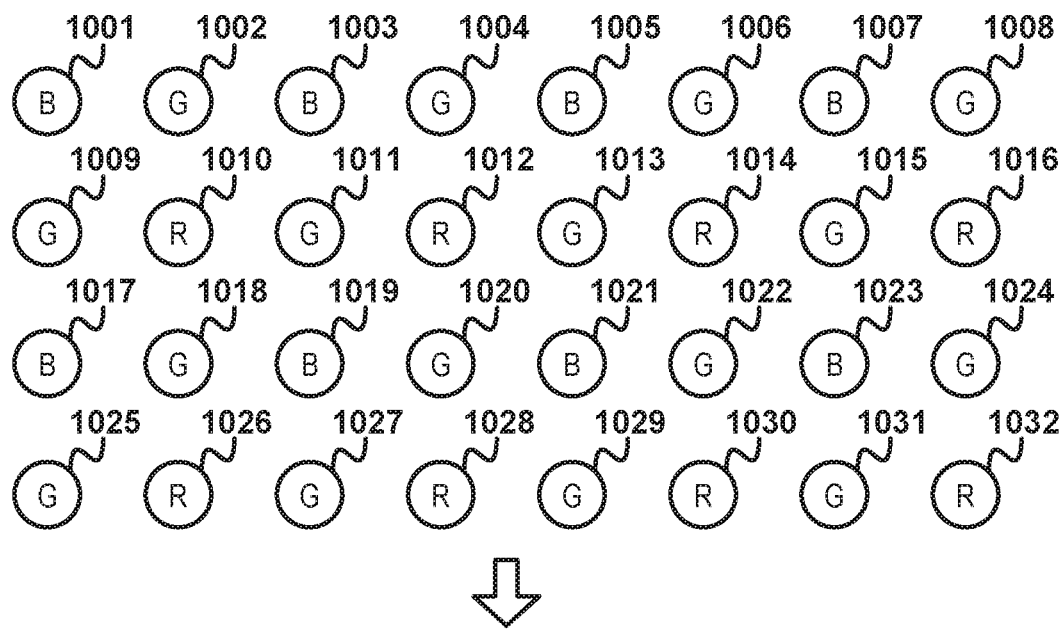
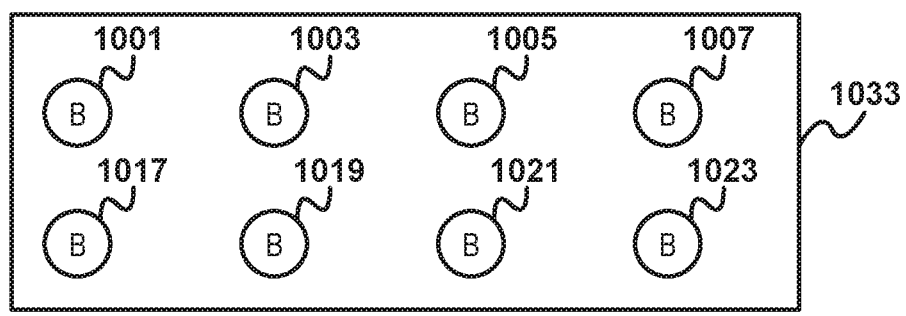
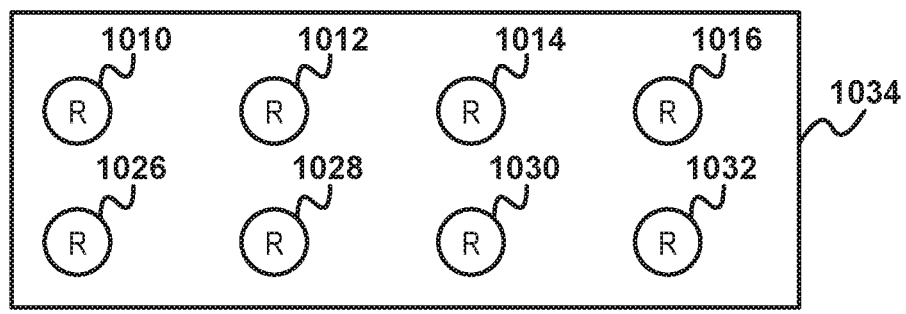

IMAGE PROCESSING APPARATUS, IMAGE PROCESSING METHOD AND NON-TRANSITORY COMPUTER READABLE STORAGE MEDIUM

BACKGROUND OF THE INVENTION

Field of the Invention

The invention relates to an image processing apparatus, an image processing method, and a non-transitory computer readable storage medium.

Description of the Related Art

In recent years, regarding moving images that are handled in digital televisions, digital cameras and the like, the number of pixels is increasing and the frame rate is increasing. Therefore, the data amounts of pixel data processed by these apparatuses are rapidly increasing. In these apparatuses, a memory such as a DRAM is used to process image data. In view of this, it is conceivable that the image data is compressed before being written into the memory. For example, at a compression rate of approximately 50%, it is possible to reduce the data amount without causing the deterioration of the visual image quality.

In the case of compressing an image, it is desirable that delay in the processing is small, and the apparatus is constituted by as simple a circuit as possible. Accordingly, as an encoding method for image compression suitable for such conditions, a DPCM (differential pulse code modulation) encoding method has been suggested (see Japanese Patent Laid-Open No. 2010-004514).

The DPCM encoding method is a method for performing compression by encoding the difference between reference data and data to be encoded by taking advantage of high spatial correlation between images, and can be realized by a relatively simple circuit.

If the encoding is performed without considering high spatial correlation specific to image data in a two dimensional array when performing compression by DPCM, it is highly possible that the encoding efficiency is decreased.

SUMMARY OF THE INVENTION

Accordingly, the invention provides an apparatus that can perform efficient compression by determining an encoding order of pixels considering the spatial correlation when encoding image data by the DPCM method.

One aspect of embodiments of the invention relates to an image processing apparatus comprising, a supply unit configured to supply image data one piece of pixel data at a time, and, an encoding unit configured to encode the image data supplied by the supply unit, the encoding unit selecting, as prediction pixel data, locally decoded data of one pixel out of n pixels (n is an integer greater than or equal to 2) that were encoded immediately before a pixel to be encoded and have been locally decoded, and encoding a difference between the prediction pixel data and data of the pixel to be encoded, wherein the supply unit supplies pixel data to the encoding unit in a predetermined order according to which all of the n pixels are pixels that are adjacent to the pixel to be encoded.

Further features of the invention will become apparent from the following description of exemplary embodiments (with reference to the attached drawings).

BRIEF DESCRIPTION OF THE DRAWINGS

FIG. 1 is a diagram showing a configuration example of an image processing apparatus.

FIG. 10 is a diagram showing an example of the arrangement of pixels in a Bayer array.

DESCRIPTION OF THE EMBODIMENTS

First Embodiment

A first embodiment of the invention will be described below. FIG. 1 is a diagram showing an example of the configuration of an image processing apparatus in the embodiments of the invention. The image processing apparatus includes an acquisition unit 101, a memory 102, a supply unit 103, and an encoding unit 104, for example. In the image processing apparatus in FIG. 1, each block may be constituted in a hardware-like manner by using a dedicated device, a logic circuit or a memory. Alternatively, each block may be constituted in a software-like manner by a computer such as a CPU executing a processing program stored in the memory.

In FIG. 1, the acquisition unit 101 receives image data. The acquisition unit 101 includes an image capturing unit provided with an imaging sensor, and a configuration for receiving image data from the outside via a transmission path, for example. Alternatively, the acquisition unit 101 includes a configuration for reading out image data from a recording medium or the like. In addition, the image data that is acquired may be still image data, or may be moving image data. In the case where the image data acquired by the acquisition unit 101 is moving image data, moving image data corresponding to a plurality of frames is consecutively acquired. In addition, the acquisition unit 101 outputs image data for one screen in the order of raster scanning; however, instead, image data for two lines may be output in parallel.

The acquisition unit 101 stores the obtained image data in the memory 102. The memory 102 has a capacity capable of storing image data for the number of pixels necessary for the encoding unit 104 to perform encoding. For example, the memory 102 has a capacity capable of storing image data for one screen.

As will be described later, the supply unit 103 reads out the image data of each pixel stored in the memory 102 in an order suited to encoding processing that is performed by the encoding unit 104, and outputs the image data to the encoding unit 104. The encoding unit 104 encodes the image data supplied from the supply unit 103 in accordance with a differential pulse code modulation method (DPCM method), and outputs encoded data whose information amount is compressed. The encoded data that was output is stored in a memory such as a DRAM (not illustrated).

Figure 4:
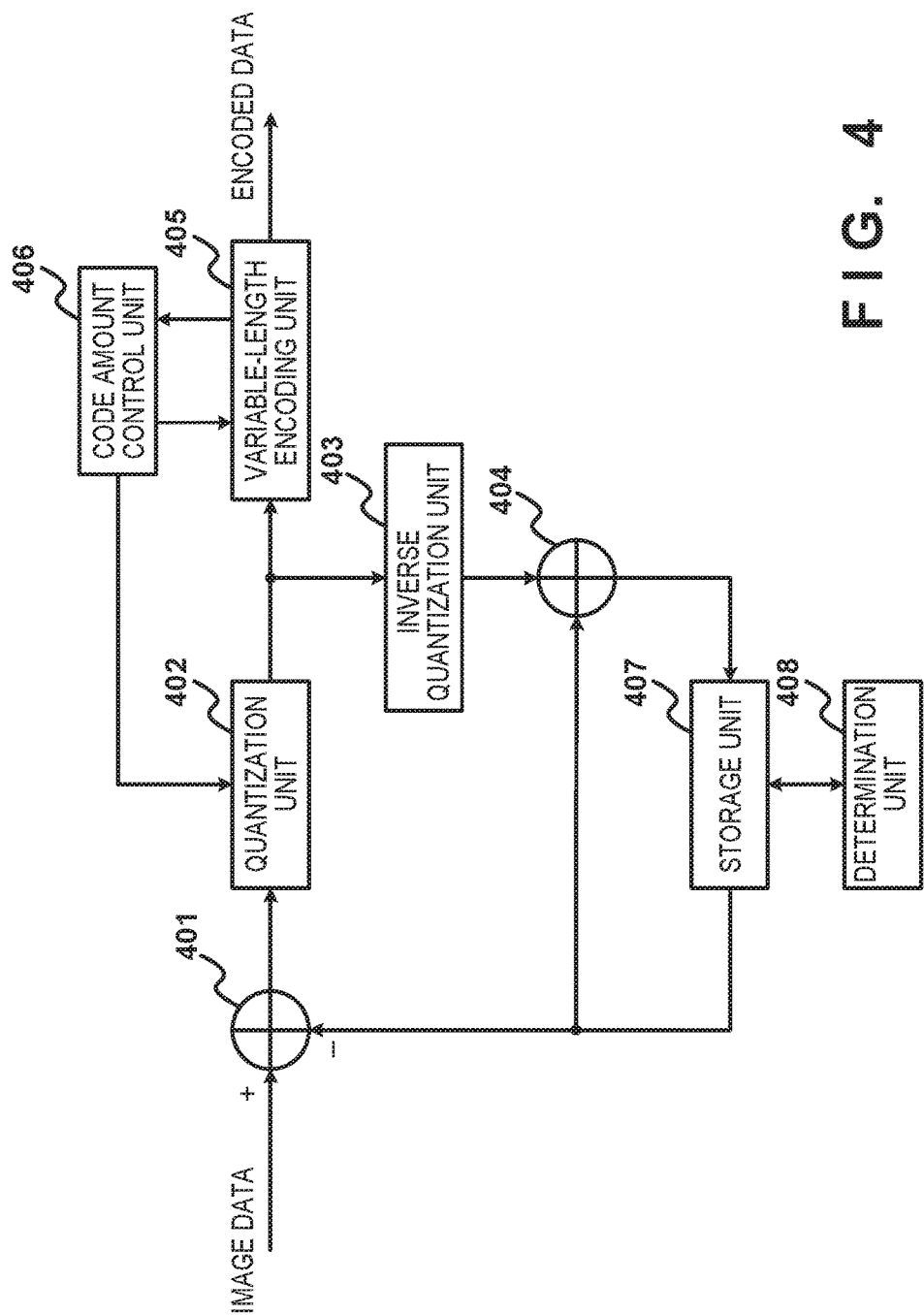
FIG. 4 is a diagram showing an example of a configuration of an encoding unit.

The configuration of the encoding unit 104 is shown in FIG. 4. In FIG. 4, the image data from the supply unit 103 is received one pixel at a time. A subtractor 401 subtracts image data of a prediction pixel from a storage unit 407 from the input image data, and transmits the difference (prediction error) to a quantization unit 402. The quantization unit 402 quantizes the difference data from the subtractor 401 in accordance with a quantization step that corresponds to a set quantization parameter, and outputs the quantized data to an inverse quantization unit 403 and a variable-length encoding unit 405. The variable-length encoding unit 405 performs variable length encoding such as known entropy encoding on the data from the quantization unit 402, and outputs the encoded data.

On the other hand, the inverse quantization unit 403 performs inverse quantization on the data from the quantization unit 402 based on the quantization parameter in the quantization unit 402, and outputs the data to an adder 404. The adder 404 adds the data from the inverse quantization unit 403 to the image data of the prediction pixel output from the storage unit 407, generates locally decoded data, and outputs the locally decoded data to the storage unit 407. The storage unit 407 stores the image data that is used as the prediction pixel (reference pixel) for encoding image data of a pixel to be encoded, as will be described later. In this embodiment, locally decoded data of n pixels (n is an integer greater than or equal to 2) encoded immediately before the pixel to be encoded is stored as candidates for a prediction pixel. A determination unit 408 determines a prediction pixel for the pixel to be encoded from among the candidate pixels, which are the n prediction pixels stored in the storage unit 407, and outputs the image data of the prediction pixel to the subtractor 401 and the adder 404. The candidate pixels for the prediction pixel stored in the storage unit 407, and prediction pixel determination processing performed by the determination unit 408 will be described later.

A code amount control unit 406 determines a quantization parameter based on a generated code amount sent from the variable-length encoding unit 405, such that the code amount of a predetermined number of pixels becomes a determined code amount, and sends the quantization parameter to the quantization unit 402 and the variable-length encoding unit 405. The quantization unit 402 performs quantization in accordance with the quantization parameter from the code amount control unit 406. In addition, the variable-length encoding unit 405 encodes the quantization parameter determined by the code amount control unit 406, and multiplexes the encoded quantization parameter on encoded image data and outputs the parameter. For example, it is assumed that the compression rate is set to 50% for every sixteen pixels. At this time, assuming that one pixel is 8 bits, the data amount before image data of sixteen pixels is encoded is 128 bits, and therefore in the case where the compression rate is 50%, the code amount is controlled such that the data amount after the encoding is 64 bits.

The image data that undergoes encoding processing according to this embodiment is data in various formats such as the RGB format or the YCrCb format. In this embodiment, a case of processing image data in the YCrCb format will be described below.

In addition, in this embodiment, a predetermined number of pixels having the same pixel component in a two dimensional array of image data obtained by the acquisition unit 101 is used as one unit when performing encoding. For example, a pixel block constituted by luminance signals of 8×2 pixels, namely, eight pixels in the horizontal direction (eight columns) and two pixels in the vertical direction (two rows) is used as one unit when performing encoding. Note that the encoding unit may be a unit of any number of pixels, as long as the unit is constituted by a plurality of pixels both horizontally and vertically in a two dimensional array. For example, a configuration may be adopted in which the pixel block includes all the pixels in one line in the horizontal direction and two pixels in the vertical direction, such that all the pixels in two lines are used as the encoding unit.

Figure 2A:
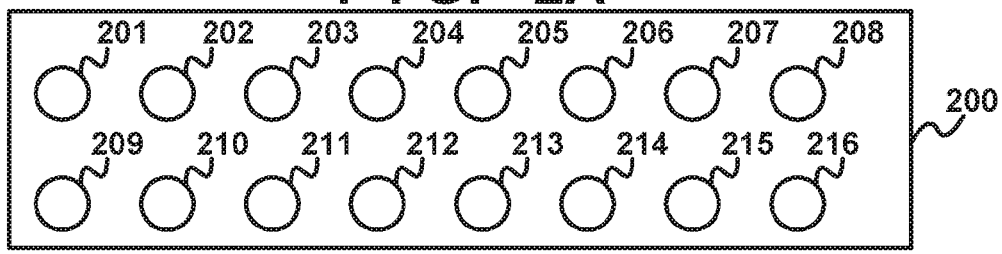
FIGS. 2A to 2E are diagrams for illustratively describing arrangements and encoding orders of pixels, and reference pixels.

After the image data of pixels that are necessary for the encoding is stored in the memory 102, the supply unit 103 reads out the pixel data of the pixels from the memory 102 one pixel at a time, and sequentially outputs the image data for one pixel at a time to the encoding unit 104. An example of one pixel block in the image data stored in the memory 102 is shown in FIG. 2A. As shown in FIG. 2A, one pixel block 200 is constituted by 8 pixels horizontally×2 pixels vertically, namely, pixels 201 to 216.

Figure 2B:
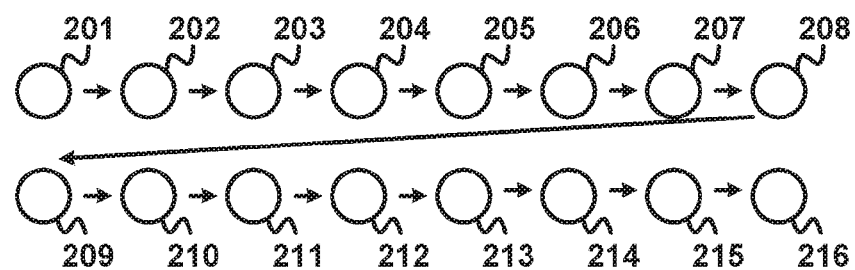
Figure 2C:
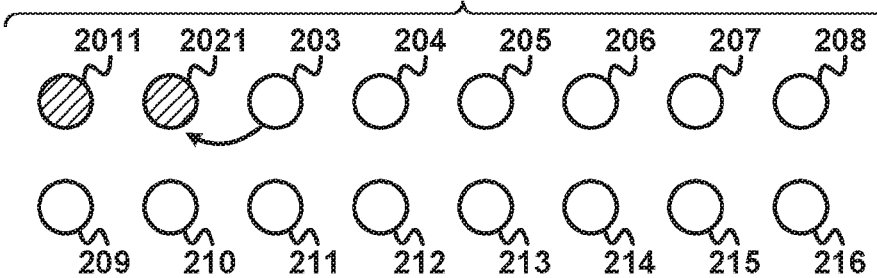

Next, the order of pixels supplied by the supply unit 103 will be described. The order in the case of supplying pixels in the order of raster scanning is shown in FIG. 2B. In this case, as indicated by an arrow in FIG. 2B, image data is supplied in the order of pixels 201, 202 and 203 in the pixel block 200, and following the pixel 208, the pixel 209 is supplied. The state at the time of encoding the pixel 203 is shown in FIG. 2C. In FIG. 2C, the pixel data 2011 and the pixel data 2021 have been encoded at the time of starting the encoding of the pixel 203, and are stored as locally decoded data. The adjacent pixel 2021 having a higher correlational relationship out of these encoded pixels is used as the prediction data, and the difference from the pixel 2021 is encoded.

In the case of reading out the image data in the raster order and sequentially encoding the difference from the adjacent pixel in a two dimensional array in this manner, only the pixel adjacent to the left is an option for the prediction pixel.

Figure 2D:
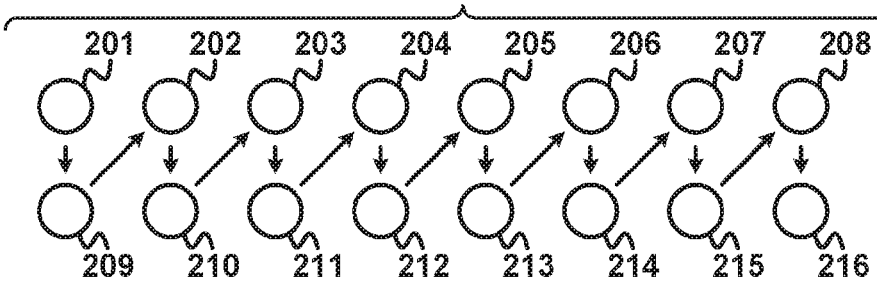

In view of this, in this embodiment, the image data of the pixels is read out from the memory 102 in the order shown in FIG. 2D, and is output to the encoding unit 104. That is, following the pixel 201 in the first row at the left end on the upper side, the pixel 209 in the second row below the pixel 201 is output. Following the pixel 209, the pixel 202 in the first row in the upper right direction from the pixel 209 is output. Subsequently, encoding is performed in an order corresponding an inverted N (in the inverted N-shaped order) of alternately reading out pixels adjacent to each other in the first and second rows while moving in the lower direction then in the right-upper direction. Note that in this embodiment, regarding the "adjacent pixel", the direction in which a pixel is adjacent is a concept that includes the horizontal direction (row direction), the vertical direction (column direction) and oblique directions (also referred to as upper left/lower right, lower left/upper right).

Figure 2E:
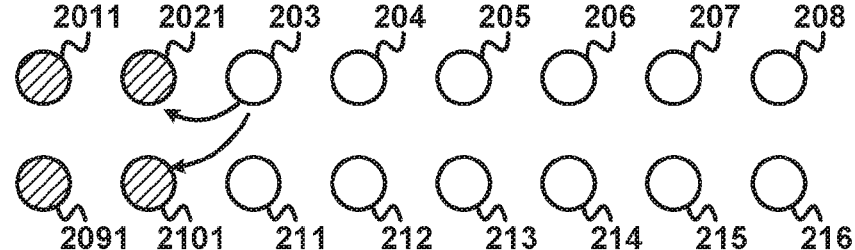

FIG. 2E shows the state at the time of starting the encoding of the pixel 203 in the case of encoding in the inverted N-shaped order in FIG. 2D. In the pixel block 200, at the time of encoding the pixel 203, the pixels 201, 209, 202, and 210 have been encoded. The pixel data 2011, the pixel data 2091, the pixel data 2021, and the pixel data 2101 are respectively the locally decoded data of the pixels 201, 209, 202, and 210. In this embodiment, locally decoded data for m pixels immediately before the pixel to be encoded is stored in the storage unit 407 in the inverted-N-shaped order, in order to determine prediction pixel data. It is assumed that in this embodiment, the relationship between the number of pixels n and the number of pixels m satisfies the relationship of m>n, and as an example, the number of pixels n that become candidates for the prediction pixel can be two, and the number of pixels m can be three. In this case, two pixels that become candidates for the prediction pixel correspond to two pixels immediately before the pixel to be encoded in the inverted N-shaped order. Two pixels out of three pixels stored in the storage unit 407 are those two preceding pixels, and the remaining one pixel is the pixel encoded immediately before the two pixels. When new candidate data for the prediction pixel is input to the storage unit 407, the oldest data is deleted.

Therefore, at the time of encoding the pixel 203, pixel data 2091, 2021, and 2101 has been stored in the storage unit 407. Out of the pixel data, either the pixel data 2021 or the pixel data 2101 that is adjacent to the pixel 203 is determined as the prediction pixel data by the determination unit 408.

In this manner, in the case of reading out the image data in the inverted N-shaped order shown in FIG. 2D, and sequentially encoding the difference from an adjacent pixel in a two dimensional array, there are two pixels adjacent to the left and lower left as options for the prediction pixel for the pixel 203. That is, candidate pixel data, which has pixels (the pixel 202 and the pixel 210) that are adjacent to the pixel 203 to be encoded in different directions, is stored in the storage unit 407. Therefore, the determination unit 408 selects one of these two candidate pixels as the prediction pixel, and therefore data of a pixel whose spatial correlation is higher can be used as the prediction pixel data.

If the correlation between a pixel to be encoded and a prediction pixel is high, a difference between the pixel to be encoded and the prediction pixel (prediction error) becomes small. Therefore, because a quantization coefficient becomes small after quantizing in the quantization unit 402, it is possible to allocate a smaller code in the variable-length encoding unit 405. However, if the correlation between a pixel to be encoded and a prediction pixel is small, a difference between the pixel to be encoded and the prediction pixel becomes large. Therefore, to control so that encoded data amount of the encoded data becomes a target encoded data amount, there is a necessity to set the quantization step by the quantization unit 402 to be large and make the quantization coefficient output from the quantization unit 402 to be small, and image quality deteriorates.

Figure 3A:
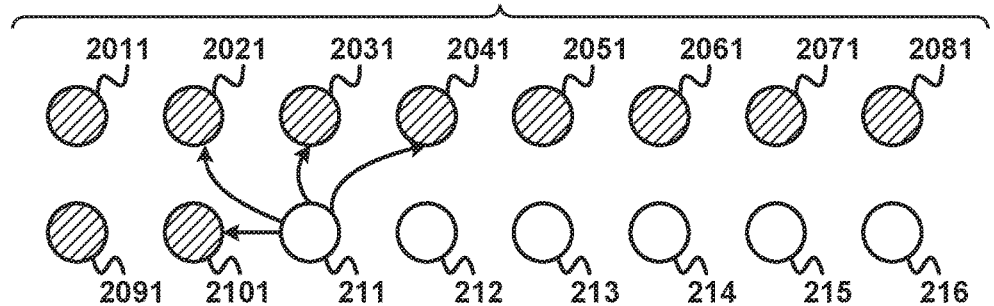
FIGS. 3A to 3C are diagrams for illustratively describing encoding orders of pixels, and reference pixels.

Next, the case of encoding the pixel 211 will be described. FIG. 3A shows a state at the time of encoding the pixel 211 in the case of reading out the pixel data in the raster order as in FIG. 2B and encoding the pixel data. As shown in FIG. 3A, the pixel data that has been encoded at the time of encoding the pixel 211 and is adjacent to the pixel 211 is the pixel data 2021, 2031, 2041, and 2101. Therefore, these four pixels are options for the prediction pixel. However, in this case, it is necessary to store the pixel data of all the pixels 2021 to 2101 as the pixel data of the prediction pixel candidates, and therefore it is required to prepare a memory having a large capacity.

Figure 3B:
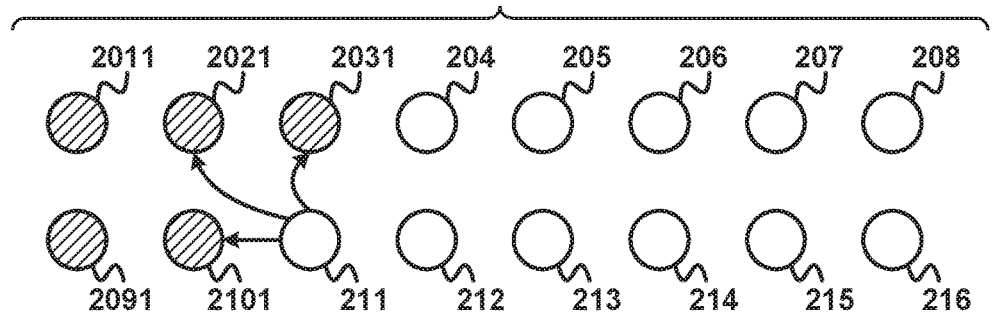

FIG. 3B shows a state at the time of encoding the pixel 211 in the case of reading out the pixel data from the memory 102 in the inverted N-shaped order as shown in FIG. 2D, and encoding the pixel data. In this embodiment, pixel data is read out in the order shown in FIG. 2D, and therefore the pixel data that has been encoded at the time of encoding the pixel 211 and that is adjacent to the pixel 211 is the pixel data 2021, 2031, and 2101. Therefore, these three pixels are candidates for the prediction pixel (n=3).

In the case where there are three candidates for the prediction pixel, the directions in which the pixel data 2021, the pixel data 2091, and the pixel data 2011 are adjacent to the pixel to be encoded are respectively the up-down direction (the vertical direction), the right-left direction (the horizontal direction), and the upper left direction (oblique direction). Therefore, it is necessary to determine the correlation for each of the directions. In the state shown in FIG. 3B, if these three pixels are used, the correlation can be determined for the horizontal direction and the vertical direction, but the determination cannot be performed for the upper left direction. In order to determine the correlation for the upper left direction, the pixel data 2011 is necessary, and the storage unit 407 will store locally decoded data for five pixels, namely, the pixel data 2011 to 2031 (m=5). In this case, compared with the case where the pixel to be encoded described with reference to FIG. 2E is in the first row (in the case where the pixel to be encoded is the pixel 203), locally decoded data that is to be stored will be increased by two pixels. Furthermore, unnecessary pixel data is deleted from the storage unit 407 in chronological order, and therefore it is not possible to perform switching such that data for three pixels is stored only when the pixel to be encoded is in the first row, and data for five pixels is stored when the pixel to be encoded is in the second row. Thus, if data for five pixels is stored for the pixel in the second row to be encoded, data for five pixels will be stored for the pixel to be encoded in the first row as well. Note that even in the case where data for five pixels is stored, determination of the direction of the adjacent pixel can be performed similarly to the case where data for three pixels is stored. Accordingly, in order to simplify the description, the case where locally decoded data is stored for three pixels that were encoded before the pixel to be encoded will be described below. In this case, the pixel data 2021, 2101, and 2031 is input in this order in the storage unit 407, and thus it is sufficient that the storage unit 407 has a capacity capable of storing the pixel data for these three pixels, making it possible to reduce the memory capacity compared with the case of performing reading out in the raster order.

Next, prediction pixel data determination processing performed by the determination unit 408 will be described. The determination unit 408 detects the direction in which the correlation with the pixel to be encoded is highest, using the reference pixel data obtained by locally decoding pixels that have been encoded and stored in the storage unit 407. The adjacent pixel in the direction in which the correlation is highest is then output as the prediction pixel data.

Figure 5A:
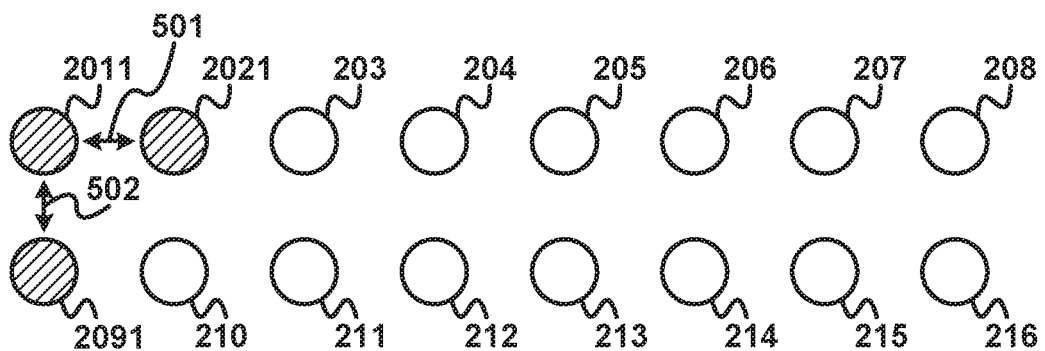
FIGS. 5A to 5C are diagrams for illustratively describing a method for determining reference pixels.

FIG. 5A is a diagram for describing processing for determining prediction pixel data for the pixel 210 by the determination unit 408 in the case of reading out pixel data in the inverted N-shaped order as in FIG. 2D and encoding the pixel data. As described above, in this embodiment, pixel data is read out in the inverted N-shaped order shown in FIG. 2D and is encoded. Therefore, the pixel data 2011, 2091, and 2021 has been stored in the storage unit 407 at the time of encoding the pixel 210. The determination unit 408 detects the absolute value of the difference between the pixel data 2011 and the pixel data 2021 that are adjacent horizontally as indicated by an arrow 501, and the absolute value of the difference between the pixel data 2011 and the pixel data 2091 that are adjacent vertically, as indicated by an arrow 502. These two difference values are then compared, and the pixel data to be used as the prediction pixel data for the pixel 210 is determined based on the direction in which a smaller difference value was obtained.

For example, letting that the value of the pixel data 2021 be p2021, and the value of the pixel data 2011 be p2011, the correlation value rel_h in the right-left direction (the horizontal direction, row direction) can be obtained by the following expression 1. Here, abs( ) is a function for outputting an absolute value.

$$rel\_h = abs(p2021 - p2011) \qquad \text{Exp. 1}$$

The strength of the correlation in the up-down direction (the vertical direction, column direction) is calculated using the pixel data 2091 and 2011 adjacent to the pixel 210. Letting that the value of the pixel data 2091 be p2091, the correlation value rel_v in the up-down direction can be obtained by the following expression 2.

$$rel\_v = abs(p2091 - p2011) \qquad \text{Exp. 2}$$

The determination unit 408 compares the correlation values rel_h in the right-left direction and rel_v in the up-down direction, and determines the direction in which the spatial correlation is higher. For example, in the case where the difference between the pixel data 2011 and the pixel data 2021 is smaller, the correlation in the horizontal direction is higher. Therefore, out of the two pieces of pixel data 2021 and 2091, the pixel data 2091 adjacent to the pixel 210 in the horizontal direction is determined as the prediction pixel data for the pixel 210. In addition, in the case where the difference between the pixel data 2011 and the pixel data 2091 is smaller, the correlation in the vertical direction is higher. Therefore, out of the two pieces of pixel data 2021 and 2091, the pixel data 2021 is determined as the prediction pixel data for the pixel 210.

Figure 5B:
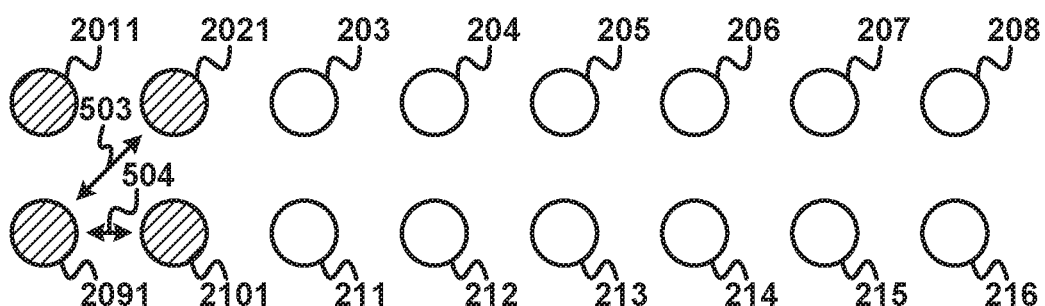

FIG. 5B is a diagram for describing processing for determining the prediction pixel data for the pixel 203 by the determination unit 408 in the case of reading out pixel data in the inverted N-shaped order in FIG. 2D and encoding the pixel data. At the time of encoding the pixel 203 to be encoded, the pixel data 2091, 2021, and 2101 has been stored in the storage unit 407. The determination unit 408 detects the absolute value of the difference between the pixel data 2021 and the pixel data 2091 that are adjacent in the lower left (upper right) direction as indicated by an arrow 503, and the absolute value of the difference between the pixel data 2091 and the pixel data 2101 as indicated by an arrow 504. Then, these two difference values are compared, and the pixel data to be used as the prediction pixel data for the pixel 203 is determined based on the direction in which a smaller difference value is obtained.

For example, letting that the value of the pixel data 2091 be p2091, and the value of the pixel data 2101 be p2101, the correlation value in the right-left direction rel_h can be obtained by the above expression 1. On the other hand, for example, letting that the value of the pixel data 2091 be p2091, and the value of the pixel data 2021 be p2021, the correlation value in the lower left (upper right) direction rel_d can be obtained by the following expression 3. Here, it is assumed that abs( ) is a function for outputting an absolute value.

$$rel\_d = abs(p2021 - p2091) \qquad \text{Exp. 3}$$

At this time, for example, in the case where the difference between the pixel data 2021 and the pixel data 2091 is smaller, the correlation in the lower left direction is higher. Therefore, out of the two pieces of pixel data 2021 and 2101, the pixel data 2101 adjacent to the pixel 203 in the lower left direction is determined as the prediction pixel data for the pixel 210. In addition, in the case where the difference between the pixel data 2091 and the pixel data 2101 is smaller, the correlation in the horizontal direction is higher. Therefore, out of the two pieces of pixel data 2021 and 2101, the pixel data 2021 is determined as the prediction pixel data for the pixel 210.

Figure 5C:
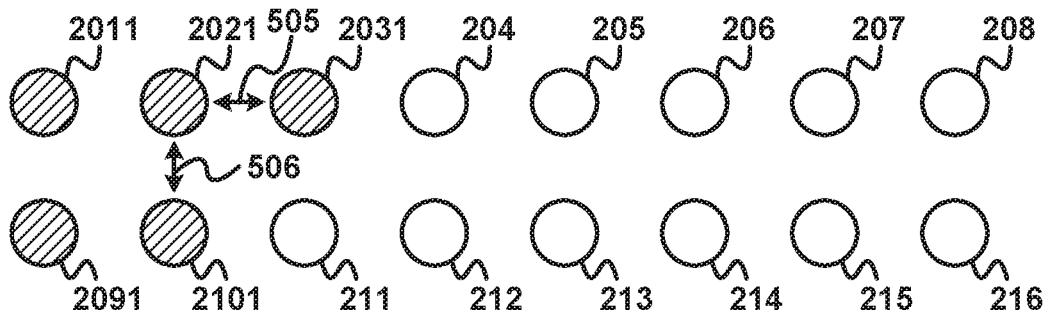

FIG. 5C is a diagram for describing processing for determining prediction pixel data for the pixel 211 by the determination unit 408 in the case of reading out pixel data in the inverted N-shaped order as in FIG. 2D and encoding the pixel data. As described above, in this embodiment, pixel data is read out in the order shown in FIG. 2D, and is encoded. Therefore, at the time of encoding the pixel 211, the pixel data 2021, 2101, and 2031 has been stored in the storage unit 407. The determination unit 408 detects the absolute value of the difference between the pixel data 2021 and the pixel data 2031 as indicated by an arrow 505, and the absolute value of the difference between the pixel data 2021 and the pixel data 2101 as indicated by an arrow 506. Then, these two difference values are compared, and the pixel data to be used as the prediction pixel data for the pixel 211 is determined based on the direction in which a smaller difference value is obtained.

For example, in the case where the difference between the pixel data 2021 and the pixel data 2031 is smaller, the correlation in the horizontal direction is higher. Therefore, out of the two pieces of pixel data 2031 and 2101, the pixel data 2101 adjacent to the pixel 211 in the horizontal direction is determined as the prediction pixel data for the pixel 211. In addition, in the case where the difference between the pixel data 2021 and the pixel data 2101 is smaller, the correlation in the vertical direction is higher. Therefore, out of the two pieces of pixel data 2031 and 2101, the pixel data 2031 is determined as the prediction pixel data for the pixel 211.

In this manner, in this embodiment, in the case where pixels that were encoded before and are adjacent to the pixel to be encoded are used as the prediction pixels and DPCM encoding is performed, a predetermined order considering the spatial correlation is determined as the order of output to the encoding unit, and thereby a plurality of adjacent pixels can be used as the prediction pixels. In addition, if the order of output to the encoding unit is determined considering the spatial correlation, only n pixels (n is an integer greater than or equal to 2) immediately before the pixel to be encoded in the predetermined order are required as pixels that are held as candidates for the prediction pixel. Locally decoded data of m (m>n) pixels encoded immediately before the pixel to be encoded in the predetermined order is also held, and the direction in which the correlation with the pixel to be encoded is higher is detected. Encoding is then performed using the prediction pixel data adjacent in the detected direction, thereby making it possible to perform more efficient compression.

Figure 3C:
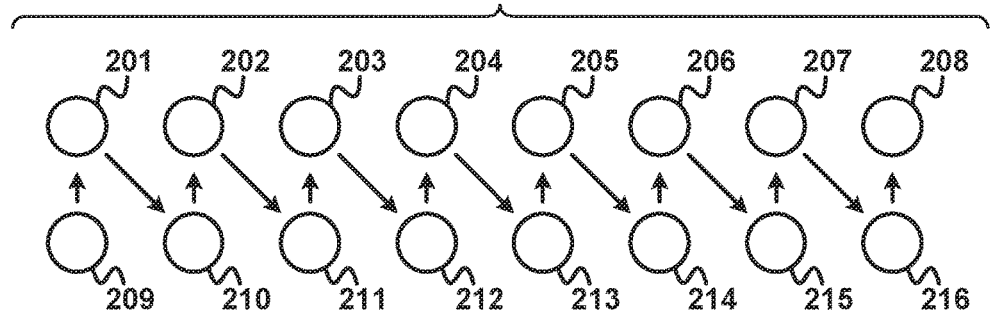

Note that in this embodiment, the data of the pixels is output to the encoding unit 103 in the order called the inverted N-shaped order shown in FIG. 2D, but the data can be output in other orders. For example, similar effects can be obtained with an order corresponding to the letter N (the N-shaped order) of repeating alternate selection of pixels adjacent to each other in the second and first rows in the order of the upper direction, the right lower direction, upper direction, and right lower direction, specifically, starting from the lower leftmost pixel 209, and then proceeding to the pixel 201 above the pixel 209, and the pixel 210 to the lower right of the pixel 201 in one pixel block, as shown in FIG. 3C.

Second Embodiment

Next, a second embodiment of the invention will be described. In this embodiment as well, the configuration of the image processing apparatus is similar to the configuration shown in FIG. 1, and the configuration of the encoding unit 103 is also the same as the configuration in FIG. 4. In this embodiment, the case where the image to be encoded is not in the YCrCb format but rather in the RGB Bayer array format will be described.

Figure 6:
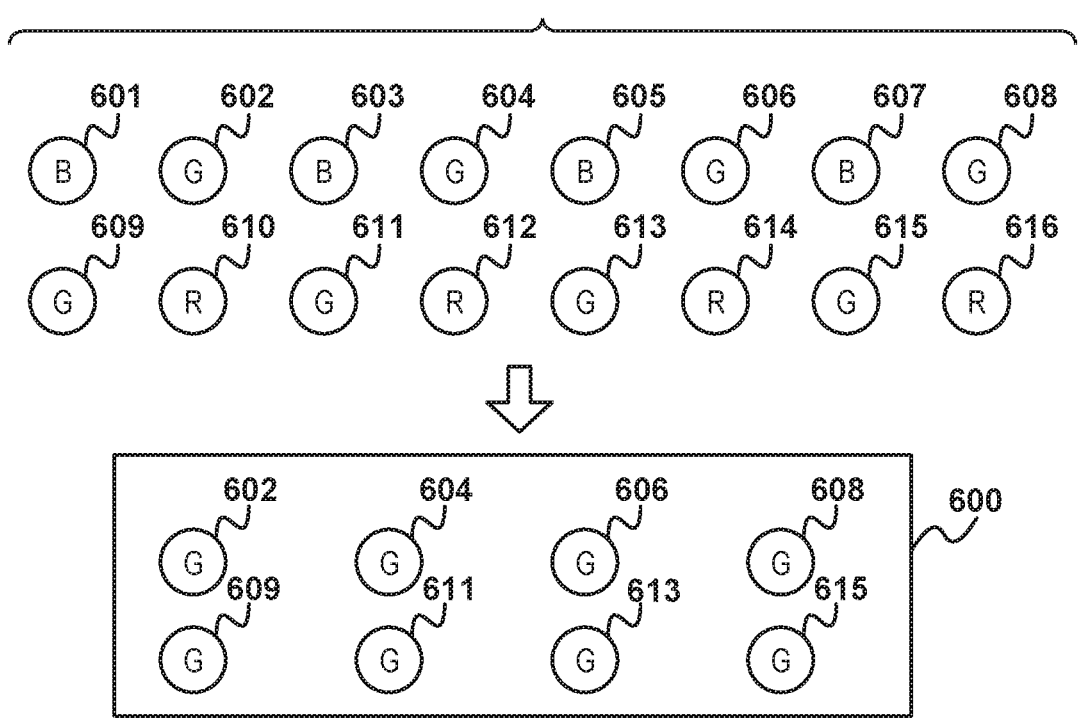
FIG. 6 is a diagram showing an example of the arrangement of pixels in a Bayer array.

The case in which G component data in the image data in the RGB Bayer array is encoded will be described. FIG. 6 shows the image data of one pixel block in this embodiment. Out of 8 pixels horizontally×2 pixels vertically, namely pixels 601 to 616, in the image data in the RGB Bayer array, pieces of image data of the same color component from pixels of the same component constitute one pixel block. For example, the pixel 602, the pixel 604, the pixel 606, the pixel 608, the pixel 609, the pixel 611, the pixel 613, and the pixel 615 that are G component pixels constitute one pixel block 600.

The encoding unit 104 then performs encoding on this G component pixel block in a two dimensional array. Here, the differences from the first embodiment are the distance between pixels when arranged in a two dimensional array, and the distance between pixels when arranged in the Bayer array.

In the first embodiment, the encoding order is the inverted N-shaped order starting from the pixel in the first row at the left end on the upper side, and proceeding in the lower direction, the upper right direction, the lower direction, and the upper right direction as shown in FIG. 2D. As another example, as shown in FIG. 3C, the encoding order is the N-shaped order starting from the pixel in the second row at the left end on the lower side, and proceeding in the upper direction, the lower right direction, the upper direction, and the lower right direction. With image data in the YCrCb format, similar effects are obtained, whichever order is adopted for the encoding. On the other hand, in the case of encoding image data in the RGB format, different effects are obtained depending on which order is adopted for the encoding, and therefore the differences between these encoding orders will be described below.

Figure 7A:
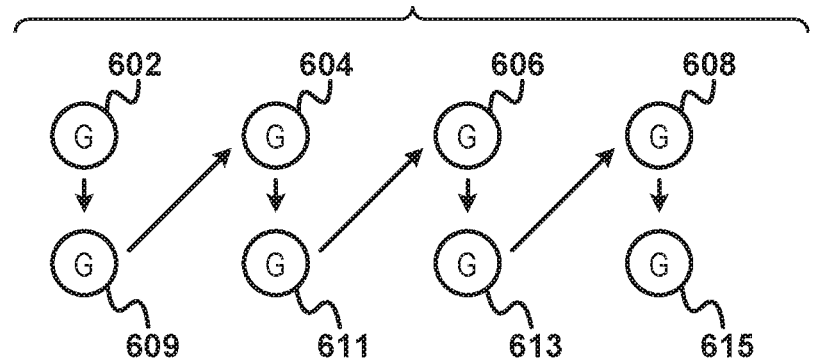
FIGS. 7A to 7C are diagrams for illustratively describing encoding orders of pixels, and reference pixels.

First, the inverted N-shaped encoding order starting from the upper left pixel will be described with reference to FIGS. 7A to 7C. As shown in FIG. 7A, encoding is performed starting from the upper left pixel 602. Following the pixel 602, the pixel 609 below the pixel 602 is encoded. Following the pixel 609, the pixel 604 above and to the right of the pixel 609 is encoded. Next, the pixel 611 below the pixel 604 is encoded. The above is repeated and the encoding is performed in the order starting from the upper left pixel, and subsequently proceeding to the pixel below that, the pixel above and to the right of that, the pixel below that, and the pixel above and to the right of that.

Figure 7B:
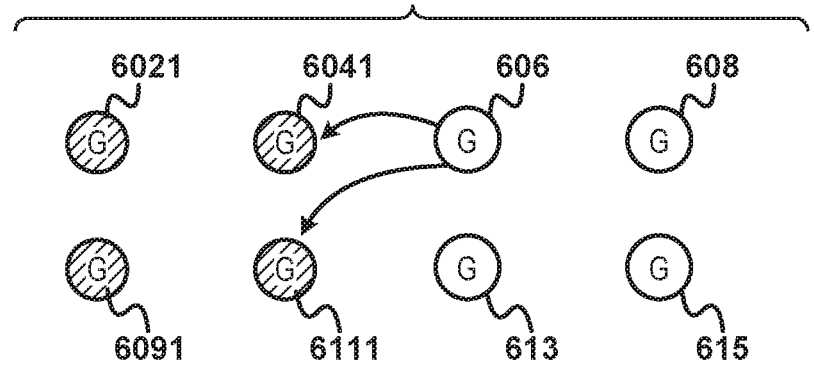
Figure 7C:
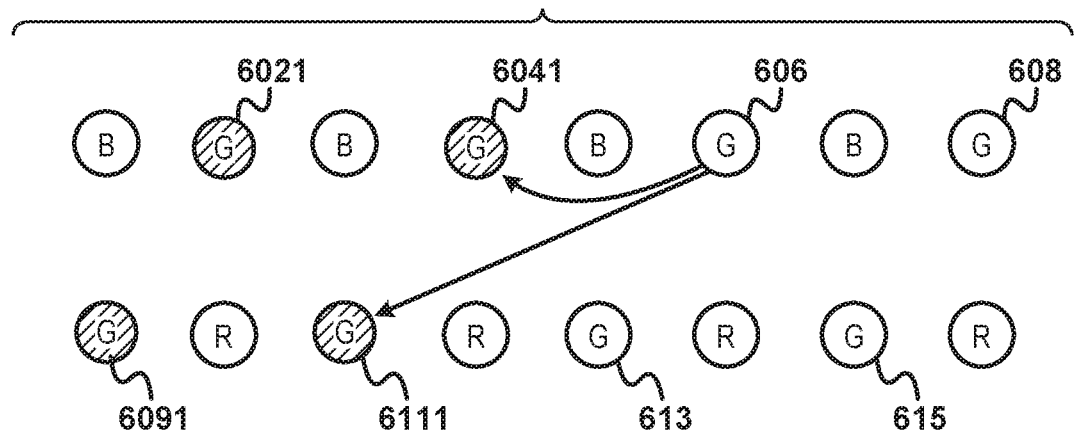

The state at the time of encoding the pixel 606 is shown in FIG. 7B. In FIG. 7B, pixels 6021, 6091, 6041, and 6111 have been encoded at the time of starting the encoding of the pixel 606, and can be stored as locally decoded data. If, for example, the pixels 6041 and 6111 out of these pixels encoded immediately before the pixel 606 are held as candidates for the prediction pixel, either of them can be used as the prediction pixel. The state of these pixels when arranged in the Bayer array is shown in FIG. 7C. Regarding the actual distance between the pixels when arranged in the Bayer array, the pixel 6041 is adjacent to the pixel 606 in the horizontal direction. On the other hand, it cannot be said that the pixel 6111 is adjacent to the pixel 606 out of the pixels of the same component. At this time, it is the pixel 613 that is adjacent to the pixel 606, but in FIG. 7C, the pixel 613 has not been encoded yet.

Figure 8A:
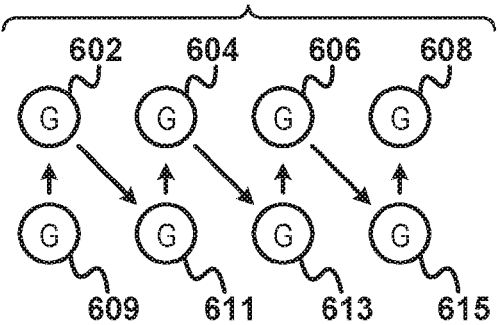
FIGS. 8A to 8E are diagrams for illustratively describing encoding orders of pixels, and reference pixels.

Next, the N-shaped encoding order starting from the lower left pixel will be described with reference to FIG. 8. As shown in FIG. 8A, encoding is performed starting from the lower left pixel 609. Following the pixel 609, the pixel 602 above the pixel 609 is encoded. Following the pixel 602, the pixel 611 below and to the right of the pixel 602 is encoded. Then, the pixel 604 above the pixel 611 is encoded. The above is repeated, and the encoding is performed in the order starting from the lower left pixel, and subsequently proceeding to the pixel above that, the pixel below and to the right of that, the pixel above that, and the pixel below and to the right of that.

Figure 8B:
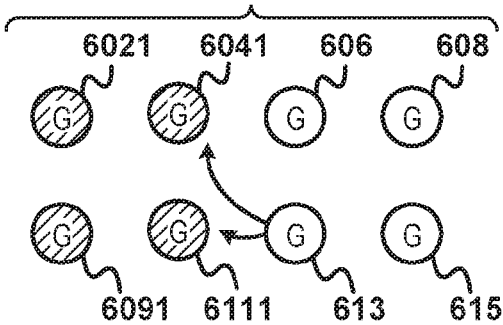
Figure 8C:
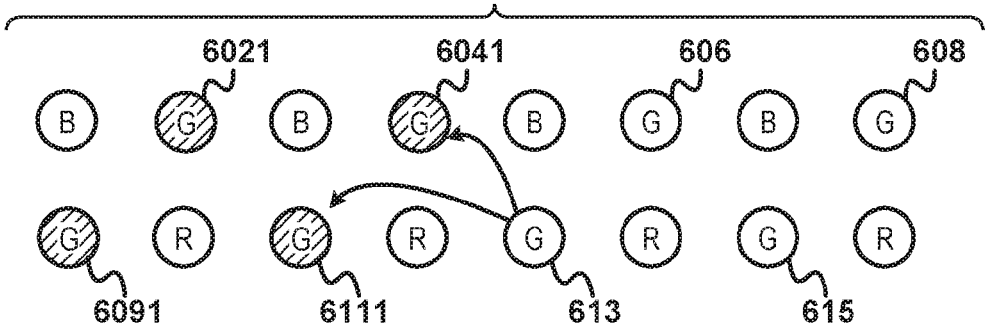

The state at the time of encoding the pixel 613 is shown in FIG. 8B. In FIG. 8B, the pixels 6021, 6091, 6041, and 6111 have been encoded at the time of starting the encoding of the pixel 613, and can be stored as locally decoded data. If, out of these pixels encoded immediately before the pixel 613, the pixels 6041 and 6111, which are the two immediately preceding pixels in the encoding order, are held as candidates for the prediction pixel, either of them can be used as the prediction pixel. The state of these pixels when arranged in the Bayer array is shown in FIG. 8C.

Regarding the actual distance between the pixels when arranged in the Bayer array, the pixel 6041 is adjacent to the pixel 613 in the upper left direction out of the pixels of the same component. In addition, the pixel 6111 is positioned so as to be adjacent to the pixel 613 in the horizontal direction out of the pixels of the same component.

Figure 8D:
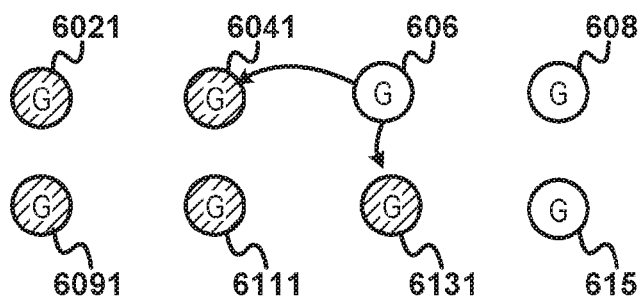
Figure 8E:
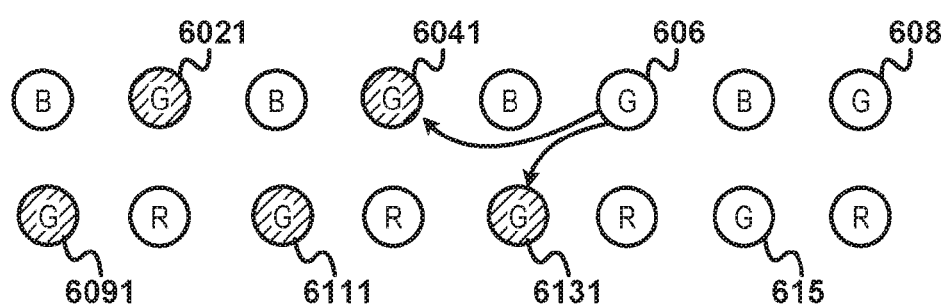

The state at the time of encoding the pixel 606 is shown in FIG. 8D. In FIG. 8D, the pixels 6021, 6091, 6041, 6111 and 6131 have been encoded at the time of starting the encoding of the pixel 606, and are stored as locally decoded data. If, out of these reference pixels encoded immediately before the pixel 613, the pixels 6041 and 6111, which are the two immediately preceding pixels, are held as candidates for the prediction pixel, either of them can be used as the prediction pixel. The state of these pixels when arranged in the Bayer array is shown in FIG. 8E.

Regarding the actual distance between the pixels when arranged in the Bayer array, the pixel 6041 is adjacent to the pixel 606 in the horizontal direction out of the pixels of the same component. In addition, the pixel 6131 is positioned so as to be adjacent to the pixel 606 in the lower left direction out of the pixels of the same component.

In the case where the image data in the Bayer array shown in FIG. 6 is encoded with respect to the same color component in this manner, it is desirable that the data of the pixels is encoded in the N-shaped order shown in FIG. 8A. In this case, the two pixels that were encoded immediately before the pixel to be encoded are both adjacent to the pixel to be encoded when arranged in the Bayer array within the same color component. Accordingly, the encoding using the adjacent pixels whose spatial correlation with the pixel to be encoded is high can be performed, making it possible to perform efficient compression.

In the case where the image data acquired by the acquisition unit 101 is image data in the Bayer array as shown in FIG. 6, the supply unit 103 reads out G pixel data from the memory 102 in the N-shaped order in units of pixel blocks, and outputs the data to the encoding unit 104.

Figure 9A:
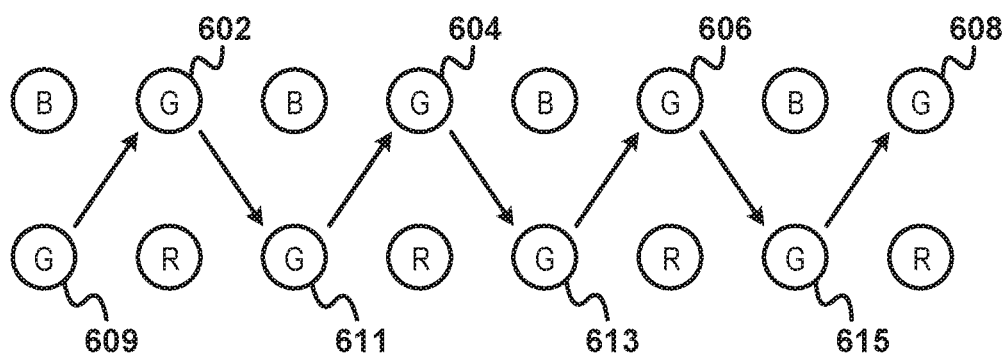
FIGS. 9A and 9B are diagrams for illustratively describing encoding orders of pixels.
Figure 9B:
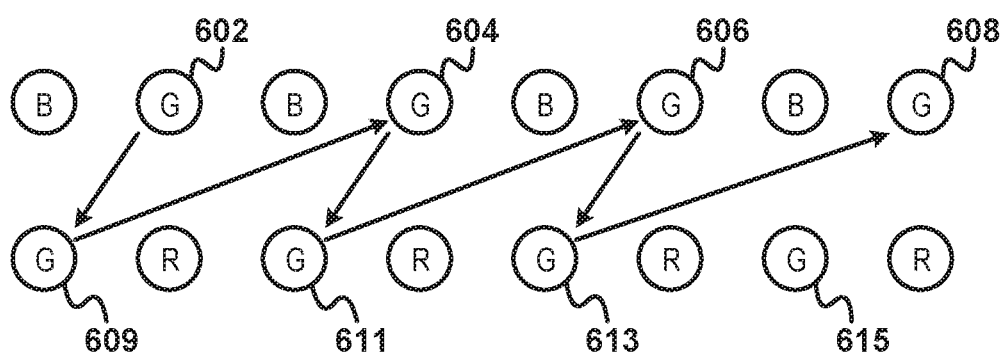

The N-shaped encoding order for G component pixels in the Bayer array is shown in FIG. 9A, and the inverted N-shaped encoding order for G component pixels in the Bayer array is shown in FIG. 9B. In the case of performing the encoding in the N-shaped order, the encoding is performed in the order of closest distance in the Bayer array, namely, in the order of the pixel 609, the pixel 602, the pixel 611, the pixel 604, etc., as shown in FIG. 9A. In contrast, the inverted N-shaped order is not an order of closest distance in the Bayer array, as shown in FIG. 9B that indicates the order of the pixel 602, the pixel 609, the pixel 604, the pixel 611, etc.

In this manner, efficient compression is made possible by performing encoding in the order of closest distance in the Bayer array. Note that in this embodiment, the case where the B component is at the upper left, the G component is at the upper right, the G component is at the lower left, and the R component is at the lower right was described as the alignment of the Bayer array, but the alignment of the Bayer array is not limited thereto, and another alignment may be adopted.

In addition, the R component pixels and the B component pixels each constitute a pixel block comprising four pixels horizontally and two pixels vertically for the same color component. The order of outputting the R component pixels and the B component pixels from the memory 102 to the encoding unit 104 may be either the N-shaped order or the inverted N-shaped order similarly to the first embodiment, and the method for determining the prediction pixel may be also similar to that in the first embodiment.

FIG. 10 shows a pixel block for the B component and a pixel block for the R component in image data in the Bayer array. As shown in FIG. 10, one pixel block 1033 is constituted by 4 pixels horizontally×2 pixels vertical for the B component, namely, a pixel 1001, a pixel 1003, a pixel 1005, a pixel 1007, a pixel 1017, a pixel 1019, a pixel 1021, and a pixel 1023. One pixel block 1034 is constituted by 4 pixels horizontally×2 pixels vertically for the R component, namely, a pixel 1010, a pixel 1012, a pixel 1014, a pixel 1016, a pixel 1026, a pixel 1028, a pixel 1030, and a pixel 1032.

In addition, regarding both the B component and the R component, the pixels adjacent in the Bayer array are also adjacent in the pixel blocks. Therefore, it is sufficient that the R component pixels and the B component pixels are encoded in the same encoding order as the first embodiment.

In addition, in the second embodiment, the encoding order for the R component, the G component and the B component is not limited in particular, but a configuration may be adopted in which encoding is performed every time data for one pixel block for the R component, G component, or B component is stored in the memory 102. In this manner, in this embodiment as well, in the case where DPCM encoding is performed using, as the prediction pixel, pixels that have been encoded immediately before the pixel to be encoded and are adjacent to the pixel to be encoded, a predetermined order considering the spatial correlation is determined as the order of output to the encoding unit, thereby making it possible to use a plurality of adjacent pixels as the prediction pixels. In particular, in the case of the G component pixels when the pixels are in the Bayer array, the N-shaped order of encoding starting from the left end in the second row as the leading head and alternately selecting the adjacent pixels in the first and second rows is adopted as the predetermined order, thereby enabling the encoding using the adjacent pixels whose spatial correlation with the pixel to be encoded is high, and making it possible to realize efficient compression.

Other Embodiments

Embodiment(s) of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-075474, filed Apr. 1, 2015 which is hereby incorporated by reference herein in its entirety.

What is claimed is:

1. An image processing apparatus comprising:
a supply unit configured to supply image data one piece of pixel data at a time; and
an encoding unit configured to encode the image data supplied by the supply unit, the encoding unit selecting, as prediction pixel data, locally decoded data of one pixel out of n pixels (n is an integer greater than or equal to 2) that were encoded immediately before a pixel to be encoded and have been locally decoded, and encoding a difference between the prediction pixel data and data of the pixel to be encoded,
wherein the supply unit supplies pixel data to the encoding unit in a predetermined order according to which all of the n pixels are pixels that are adjacent to the pixel to be encoded, and
wherein the encoding unit includes:
a storage unit configured to store the n pixels of locally decoded data, wherein each of the n pixels is adjacent to the pixel to be encoded in different directions, and
a determination unit configured to select the locally decoded data of one of the n pixels as the prediction pixel data based on the locally decoded data of n pixels stored in the storage unit,
wherein the determination unit
detects a direction in which a correlation is higher out of directions from the pixel to be encoded toward the n pixels, and determines locally decoded data corresponding to the detected direction as the prediction pixel data,
determines locally decoded data of, out of the n pixels, one pixel out of two pixels immediately before the pixel to be encoded in the predetermined order as the prediction pixel data, and
determines the direction in which the correlation is higher based on a correlation of locally decoded data between a pixel immediately before the two pixels in the predetermined order and each of the two pixels.

2. The image processing apparatus according to claim 1, wherein in units of pixel blocks each constituted by a plurality of pixels both in a horizontal direction and in a vertical direction, the supply unit supplies the image data to the encoding unit one piece of pixel data at a time, and supplies the pixel data to the encoding unit in the predetermined order for each of the pixel blocks.

3. The image processing apparatus according to claim 1, wherein in units of pixel blocks each constituted by two rows made up of a predetermined number of pixels greater than or equal to two in the horizontal direction and two pixels in the vertical direction, the supply unit supplies the image data to the encoding unit one piece of pixel data at a time, and supplies pixel data to the encoding unit in the predetermined order for each of the pixel blocks.

4. The image processing apparatus according to claim 3, wherein the predetermined order is an order of alternately selecting a pixel in a first row and a pixel in a second row from pixels adjacent to each other in the pixel block made up of two rows.

5. The image processing apparatus according to claim 3, wherein the supply unit outputs the pixel data of pixels in one pixel block, by starting supply from a pixel at a left end on an upper side in the pixel block, and subsequently repeating supply processing in an order of a lower direction and an upper right direction.

6. The image processing apparatus according to claim 3, wherein the supply unit outputs the pixel data of pixels in one pixel block, by starting supply from a pixel at a left end on a lower side in the pixel block, and subsequently repeating supply processing in an order of an upper direction and a lower right direction.

7. The image processing apparatus according to claim 1, wherein the encoding unit includes:
a quantization unit configures to quantize the difference;
an entropy-coding unit configured to perform entropy-coding on an output of the quantization unit; and
an inverse-quantization unit configured to perform inverse-quantization on the output of the quantization unit and output the locally decoded data.

8. An image processing apparatus comprising:
a supply unit configured to supply image data one piece of pixel data at a time; and
an encoding unit configured to encode the image data supplied by the supply unit, the encoding unit selecting, as prediction pixel data, locally decoded data of one pixel out of n pixels (n is an integer greater than or equal to 2) that were encoded immediately before a pixel to be encoded and have been locally decoded, and encoding a difference between the prediction pixel data and data of the pixel to be encoded,
wherein the supply unit supplies pixel data to the encoding unit in a predetermined order according to which all of the n pixels are pixels that are adjacent to the pixel to be encoded, and
wherein the image data includes a plurality of color components, and in units of pixel blocks each constituted by a plurality of pixels of the same color component in the horizontal direction and the vertical direction, the supply unit supplies the image data to the encoding unit one piece of pixel data at a time, and supplies pixel data to the encoding unit in the predetermined order for each of the pixel blocks.

9. The image processing apparatus according to claim 8, wherein the pixel blocks of the plurality of color components are each constituted by the same number of pixels in the horizontal direction and in the vertical direction.

10. The image processing apparatus according to claim 9, wherein the supply unit supplies pixel data in the same order for each of the pixel blocks of the plurality of color components.

11. The image processing apparatus according to claim 8, wherein the image data is image data in a Bayer array.

12. An image processing method comprising:
supplying image data one piece of pixel data at a time; and
encoding the image data supplied in the supplying by
selecting, as prediction pixel data, locally decoded data of one pixel out of n pixels (n is an integer greater than or equal to 2) that were encoded immediately before a pixel to be encoded and have been locally decoded, and encoding a difference between the prediction pixel data and data of the pixel to be encoded,
wherein in the supplying image data, the pixel data is supplied in a predetermined order according to which all of the n pixels are pixels that are adjacent to the pixel to be encoded, and
wherein the encoding includes:
storing the n pixels of locally decoded data in a storage unit, wherein each of the n pixels is adjacent to the pixel to be encoded in different directions;
selecting the locally decoded data of one of the n pixel as the prediction pixel data based on the locally decoded data of n pixels stored in the storage unit;
detecting a direction in which a correlation is higher out of directions from the pixel to be encoded toward the n pixels, and determining locally decoded data corresponding to the detected direction as the prediction pixel data:
determining locally decoded data of, out of the n pixels, one pixel out of two pixels immediately before the pixel to be encoded in the predetermined order as the prediction pixel data; and
determining the direction in which the correlation is higher based on a correlation of locally decoded data between a pixel immediately before the two pixels in the predetermined order and each of the two pixels.

13. A non-transitory computer readable storage medium on which is stored a program causing an image processing apparatus to perform operations of:
supplying image data one piece of pixel data at a time; and
encoding the image data supplied in the supplying by
selecting, as prediction pixel data, locally decoded data of one pixel out of n pixels (n is an integer greater than or equal to 2) that were encoded immediately before a pixel to be encoded and have been locally decoded, and encoding a difference between the prediction pixel data and data of the pixel to be encoded,
wherein in the supplying, the pixel data is supplied in a predetermined order according to which all of the n pixels are pixels that are adjacent to the pixel to be encoded, and
wherein the encoding includes:
storing the n pixels of locally decoded data in a storage unit, wherein each of the n pixels is adjacent to the pixel to be encoded in different directions;
selecting the locally decoded data of one of the n pixels as the prediction pixel data based on the locally decoded data of n pixels stored in the storage unit;
detecting a direction in which a correlation is higher out of directions from the pixel to be encoded toward the n pixels, and determining locally decoded data corresponding to the detected direction as the prediction pixel data:
  determining locally decoded data of, out of the n pixels, one pixel out of two pixels immediately before the pixel to be encoded in the predetermined order as the prediction pixel data; and
  determining the direction in which the correlation is higher based on a correlation of locally decoded data between a pixel immediately before the two pixels in the predetermined order and each of the two pixels.

14. An image processing method comprising:
supplying image data one piece of pixel data at a time; and
encoding the image data supplied in the supplying by selecting, as prediction pixel data, locally decoded data of one pixel out of n pixels (n is an integer greater than or equal to 2) that were encoded immediately before a pixel to be encoded and have been locally decoded, and encoding a difference between the prediction pixel data and data of the pixel to be encoded,
wherein in the supplying, the pixel data is supplied in a predetermined order according to which all of the n pixels are pixels that are adjacent to the pixel to be encoded, and
wherein the image data includes a plurality of color components, and in the supplying, in units of pixel blocks each constituted by a plurality of pixels of the same color component in the horizontal direction and the vertical direction, the image data is supplied by one piece of pixel data at a time, and pixel data is supplied in the predetermined order for each of the pixel blocks.

15. A non-transitory computer readable storage medium on which is stored a program causing an image processing apparatus to perform operations of:
  supplying image data one piece of pixel data at a time; and
  encoding the image data supplied in the supplying by selecting, as prediction pixel data, locally decoded data of one pixel out of n pixels (n is an integer greater than or equal to 2) that were encoded immediately before a pixel to be encoded and have been locally decoded, and encoding a difference between the prediction pixel data and data of the pixel to be encoded,
  wherein in the supplying, the pixel data is supplied in a predetermined order according to which all of the n pixels are pixels that are adjacent to the pixel to be encoded, and
  wherein the image data includes a plurality of color components, and in the supplying, in units of pixel blocks each constituted by a plurality of pixels of the same color component in the horizontal direction and the vertical direction, the image data is supplied by one piece of pixel data at a time, and pixel data is supplied in the predetermined order for each of the pixel blocks.

* * * * *